(12) United States Patent
Lewis, III

(10) Patent No.: US 12,384,698 B2
(45) Date of Patent: Aug. 12, 2025

(54) MOBILE AND MODULAR NITROGEN PRODUCTION SYSTEM AND METHOD

(71) Applicant: Green Lightning Solutions, LLC, Winchester, KY (US)

(72) Inventor: Joseph E. Lewis, III, Holly Hill, FL (US)

( * ) Notice: Subject to any disclaimer, the term of this patent is extended or adjusted under 35 U.S.C. 154(b) by 0 days.

(21) Appl. No.: 19/065,637

(22) Filed: Feb. 27, 2025

(65) Prior Publication Data
US 2025/0197251 A1 Jun. 19, 2025

Related U.S. Application Data

(63) Continuation of application No. PCT/US2024/037957, filed on Jul. 14, 2024, which is
(Continued)

(51) Int. Cl.
| | |
|---|---|
| *B01J 19/08* | (2006.01) |
| *C02F 1/30* | (2023.01) |
| *C02F 1/74* | (2023.01) |
| *H05H 1/48* | (2006.01) |
| *A01C 21/00* | (2006.01) |

(52) U.S. Cl.
CPC .................. *C02F 1/30* (2013.01); *C02F 1/74* (2013.01); *H05H 1/48* (2013.01); *A01C 21/00* (2013.01); *C02F 2201/008* (2013.01); *C02F 2305/023* (2013.01); *H05H 2245/20* (2021.05)

(58) Field of Classification Search
CPC ........ C02F 1/30; C02F 1/74; C02F 2201/008; C02F 2305/023; H05H 1/48; H05H 2245/20; H05H 1/2406; H05H 2245/40; H05H 1/482; A01C 21/00; A01C 1/08; A01C 1/00; A23B 2/003; A23B 2/50; H01J 37/32458; H01J 37/32532; H01J 37/32449; H01J 37/32816; B01J 19/088; B01J 2219/0801; B01J 2219/0869; B01J 2219/0807; B01J 2219/0896; C01B 21/203
See application file for complete search history.

(56) References Cited

U.S. PATENT DOCUMENTS

| | | | |
|---|---|---|---|
| 7,625,531 B1 * | 12/2009 | Coates | F23D 11/24 422/186.04 |
| 9,287,800 B2 | 3/2016 | Hruska et al. | |

(Continued)

*Primary Examiner* — Xiuyu Tai
(74) *Attorney, Agent, or Firm* — Lori Sandman, Esq.

(57) ABSTRACT

The invention disclosed relates to a mobile and modular nitrogen production system utilizing a non-thermal plasma reactor. The system is designed for scalable on-site production of reactive molecules including Reactive Nitrogen Species (RNS) and Reactive Oxygen Species (ROS), applicable in various industries including agriculture and healthcare. Key components include one or more improved modular plasma reactors integrated within a mobile nitrogen production system. The integrated system features a plurality of improved and removable reactors, which further comprise fixed pintle injectors for fluid introduction and flow regulation, a voltage conditioner, and a ground discharge system for electrical stabilization. A controller is integrated to manage the plasma generation process, utilizing real-time data from sensors to optimize performance. The invention offers enhanced efficiency, safety, and adaptability, with applications including producing fertilizers and other reactive species-based products.

20 Claims, 7 Drawing Sheets

Related U.S. Application Data a continuation-in-part of application No. 18/222,027, filed on Jul. 14, 2023, now Pat. No. 12,193,373, and a continuation-in-part of application No. 18/222,053, filed on Jul. 14, 2023, now Pat. No. 12,108,516, and a continuation-in-part of application No. 18/222,080, filed on Jul. 14, 2023, and a continuation-in-part of application No. 18/222,135, filed on Jul. 14, 2023, and a continuation-in-part of application No. 18/222,220, filed on Jul. 14, 2023, now Pat. No. 12,201,135, and a continuation-in-part of application No. 18/222,176, filed on Jul. 14, 2023, and a continuation-in-part of application No. 18/222,103, filed on Jul. 14, 2023, and a continuation-in-part of application No. 18/222,252, filed on Jul. 14, 2023, now abandoned.

(60) Provisional application No. 63/744,452, filed on Jan. 13, 2025, provisional application No. 63/713,958, filed on Oct. 30, 2024, provisional application No. 63/666,744, filed on Jul. 2, 2024.

(56) References Cited

U.S. PATENT DOCUMENTS

| | | | |
|---|---|---|---|
| 9,352,984 | B2 | 5/2016 | Campbell et al. |
| 11,168,007 | B2 | 11/2021 | Lewis, III |
| 11,691,995 | B2 | 7/2023 | Schoenfisch et al. |
| 2017/0301573 | A1 | 10/2017 | Shibuya et al. |
| 2020/0071199 | A1* | 3/2020 | Lewis, III ............... H05H 1/48 |
| 2021/0354105 | A1* | 11/2021 | Lewis, III ............. B01J 19/088 |
| 2021/0360847 | A1 | 11/2021 | Mcenaney et al. |
| 2023/0126050 | A1 | 4/2023 | Schwalbe et al. |
| 2023/0219052 | A1 | 7/2023 | McEnaney et al. |

* cited by examiner

MOBILE AND MODULAR NITROGEN PRODUCTION SYSTEM AND METHOD

CROSS-REFERENCE TO RELATED APPLICATIONS

This application is a continuation in part of International Application No. PCT/US24/37957, filed on Jul. 14, 2024, which claims the benefit of and priority U.S. patent application Ser. No. 18/222,027, now issued as U.S. Pat. No. 12,193,373; U.S. patent application Ser. No. 18/222,053, now issued as U.S. Pat. No. 12,108,516; U.S. patent application Ser. No. 18/222,080, U.S. patent application Ser. No. 18/222,103, U.S. patent application Ser. No. 18/222,135, U.S. patent application Ser. No. 18/222,176; and U.S. patent application Ser. No. 18/222,220, now issued as U.S. Pat. No. 12,201,135; and U.S. patent application Ser. No. 18/222,252, now abandoned, each of which were filed Jul. 14, 2023 and the disclosures of each of which are incorporated, in their entirety, by this reference, and also further claims the benefit of the filing date of Provisional Applications for Patent Application No. 63/666,744, 63/744,452 and 63/713,958 the contents of which are incorporated by reference in their entirety.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND

The present invention relates generally to the field of non-thermal plasma (NTP) technology. More specifically, it relates to the disclosure of an improved device, a system engaging and integrating a plurality of the device, and methodology for using the device and system that is designed for scalable on-site commercial production of reactive molecules. In particular, this disclosure enables on-site and scalable production of Reactive Nitrogen Species (RNS) and Reactive Oxygen Species (ROS). In addition to production of RNS and RONS, including hydrogen peroxide, the system can produce reactive species of other molecules such as, but not limited to, sulfur and carbon dioxide; it should be appreciated that the invention could be useful in the production of reactive molecules that can be used in different environments for specific product and performance outcomes and improvements.

Reactive species of various molecules are currently used in a wide range of commercial applications. The device, methodology and system as described enable the on-site and scalable use of plasma discharge for generation of useful reactive molecules across multiple industries. Specifically, the present invention has industrial applicability in farming and other agricultural uses; more generally it could be used for a diverse set of commercial or industrial applications. By way of example only, beverage and brewing industries use reactive nitrogen molecules in beverage production, including certain systems that manufacture soft drinks, fermented, and distilled beverages and mixes. In the area of human and animal skincare and wound care, an increasing variety of creams, lotions, gels and sprays are being commercialized that are formulated with different forms of nitrogen. In human healthcare, nitric oxides have been shown to enhance a spectrum of health care performance indicators, and consequently the number of products containing nitric oxides for human digestive health is growing rapidly. Other uses for the device and methodology include sanitization and sterilization applications, commercial and residential lawn and landscape maintenance, and multiple functions in the food industry.

In agriculture, nitrogen supply is critical. Under typical cultivation conditions, plants regularly undergo a multitude of stresses such as, without limitation, scarcity of water, waterlogging, toxicity, high salinity, extreme temperatures, and the like. These stresses result in impacts to plant health, and can reduce crop yields. To enhance seed germination and growth under the changing environment, techniques such as chemical, physical, and biological treatment are developing. However, existing treatments may result in changes to the plant, such as but not limited to the change of seed morphology, gene expression, or protein levels. Crops grown with such treatment may potentially be toxic to humans and/or the environment. What is needed is a way to generate stable, consistently formulated growth media, including fertilizer solutions that can be used with fertigation, irrigation, and broadcast treatments that supply readily available nutrients important for use in enhancing plant growth, including reactive nitrogen and oxygen molecules.

It is well established that plasma, in the form of atmospheric lightning will fix nitrogen (N2) molecules in the atmosphere. The atmospheric lightning breaks the N2 apart into N, where it can quickly bond with oxygen (O2) or ozone (O3) forming NO2 and NO3, which are collectively referred to as NOx. These NOx compounds become solvate within the falling rain, and upon hitting the ground the NOx infused water is much more rapidly absorbed by plants than that of man-made nitrogen fertilizers that require fixation by chemical reactions with soil biologicals. The present invention utilizes non-thermal plasma technology (NTP) to duplicate the NOx production process found in nature by exposing O2 and N2 to a plasma discharge while in the presence of water droplets.

On-farm use of fertilizer containing nitrogen is costly, both in terms of actual cash inputs and potential harm to the environment. Trucking traditional ammonium nitrate to farms in rural areas is expensive and dangerous; explosions of stored nitrogen fertilizer are not uncommon and are frequently deadly. What is needed is a cost-effective way to provide producers and manufacturers involved in a spectrum of agricultural applications with an on-site solution to meet field-specific nitrogen requirements, and a device and methodology capable of treating media to provide fertilizer and replace ammonium nitrate based fertilizers currently used in those applications.

The system of the invention incorporates two or more individual modular plasma reactors and provides the supporting framework and mechanisms needed to make the device operational and scalable, either in a stationary or mobile platform.

SUMMARY OF THE INVENTION

This disclosure presents a modular and expandable nitrogen production system, comprising an improved modular plasma reactor device with novel features enabling the device to be vertically integrated into a wide assortment of frameworks, either alone or in parallel with a plurality of other reactors. The modular plasma reactor may receive inputs from a variety of electrical, gas and liquid sources depending on the intended use and scale of the product being manufactured. The present invention provides an embodiment of framework and componentry to enable harnessing the power of a single modular plasma reactor with one or more others to achieve scalable and practical expansion of commercial potential of plasma technology to other devices, operations, and industries. Other framework configurations with conforming componentry could provide different embodiments capable of integrating plasma technology for widespread application.

In embodiments and aspects of the device and methodology disclosed, the invention provides significant improvements over existing devices and methodology in the production and transfer of gas phase RNS and ROS into solvate. The advantages of this invention over currently disclosed plasma reactors are multi-faceted and include: a simplified and scalable industrial design for a plasma reactor capable of improved productivity; a compact and mobile system for connecting, monitoring and operating two or more individual modular plasma reactors in series; and convenient access to and visibility with supporting components required to convert utility electrical power, atmospheric air and water into a solvate containing high concentrations of RNS and ROS. With these improvements, solutions can be prepared and mixed that provide concentrated nitrogen and oxygen sources that are readily available to plants both in the field and in greenhouse or other closed growing environments.

Another advantage of the device is that it is capable of mounting on top of a standard 275 gallon Intermediate Bulk Container (IBC), making it practical and compatible with current farming practice and equipment supply. The IBC tank is used to store liquid containing RNS and ROS that were produced inside the modular plasma reactors, and can be used to mix the liquid with other components to make growth media, fertilizer, or other formulations. Also, the apparatus includes the ability to accept multiple voltage types such as alternating current or direct current; it is able to operate using a standard 120 volt, 15 amp outlet and power cord. The system also includes integrated and novel water treatment components that assure that water supplied to the apparatus can be from virtually any municipal, well, or other on-site water source. These aspects, and others disclosed below demonstrate the novelty and production advantages of this invention.

The invention disclosed herein addresses several issues that have restricted or limited the ability of previous devices to produce water containing high concentrations of NOx compounds in a volume suitable for on-site farm use. The system incorporating the device comprises a sturdy framework that mounts on top of a tank. Within the framework, two or more modular plasma reactors are fixed to a supporting base. In a preferred embodiment, the system includes a control box, an on-board air compressor, a water and compressed air plumbing system, a weather-proof roof and side doors, and an external set of controls for operation along with a water input connection. An integrated water purification and remineralization unit allows for use of water from any source without clogging, quenching, or burnout typical with previously described plasma reactors.

The invention is able to produce over 100 gallons of plasma activated (PAW) that is rich in NOx per day using less than 1 kW of electrical power. At this rate of efficiency, this invention is capable of continuously generating all the nitrogen necessary for 500 to 1200 acres of crops, depending on crop type. This aspect alone makes the disclosed invention a particularly efficient method of producing large volumes of nitrogen that is suitable for commercial agriculture.

In addition to increasing production volume efficiencies, the invention disclosed enables significant improvements in NOx concentrations, and thereby product quality, by greatly improving the efficiency of gas to liquid transfer. This is accomplished using a specialized injector that mixes microfine water droplets into the gas that is injected into the modular plasma reactor. The micro-fine droplets are able to maximize the contact surface area between reactive gas species and the water, which greatly improves NOx concentration. In previously disclosed art using other NTP systems designed to produce NOx in solvate, problems existed, mostly centered around the inefficiencies associated with the mass transfer of gas phase RNS into water. The cause of the inefficiencies is predominantly the lack of penetration of the plasma discharge into the water. With an effective reach of only 1 to $2\mu$, most plasma discharges lack the ability to effectively transfer gas phase NOx into solvate with much of the gas being lost to the atmosphere. Additionally, the system provides for flexibility with respect to how fluid inputs are incorporated; it can use multiple input configurations, in contrast to existing systems which are fixed with respect to fluid inputs including gas and water.

The present invention addresses the efficiency loss issues stated above. An object of the present invention is to optimize volume and concentration efficiencies related to the production and transfer of reactive RNS into a solvate. Additional improvements are disclosed that address the issue of electrode cooling and decomposition and system scalability. Aspects of the present disclosure can be used to generate RONS and RNS, but can also be deployed to change solution properties including but not limited to pH, electrical conductivity, and oxidation-reduction potential. Aspects of the present disclosure can also be used to affect the rate of the growth medium (e.g., seed) germination, enhancement in plant growth, as well as an increase in agricultural yields. This is so, at least in part, because the system is configured to expose growth medium to a non-thermal plasma (NTP) using a high energy ignition system. The apparatus may generate a high voltage NTP using air, water, and an electrical load without any harmful emissions.

In previously disclosed plasma reaction devices, a reservoir supplied liquid to the system. In this improved invention, liquid may be supplied from a liquid source to a distribution manifold and thereby directed to one or more reactors within the system. The pressure to the injectors is regulated by the volume of water passing through a flow control regulator; this manually regulates the flow of liquid distributed to the reactors. This can be controlled electronically.

In one aspect of the invention, an improved plasma reactor device is disclosed, comprising at least:
  i. A plurality of inputs for fluids (liquid and/or gas)
  ii. One or more injectors
  iii. An ignition system
  iv. A modular plasma reactor including chamber and components
  v. A ground
  vi. A discharge
  vii. One or more test ports In another aspect, an improved system for plasma treatment of a medium via an electrical discharge is described. The improved plasma system includes at least:
  i. A fluid (liquid and/or gas) source or supply
  ii. A water treatment system iii. A pressure and flow regulator that feeds fluid into a manifold, which connects to injectors
iv. One or more plasma reactor devices releasably integrated with the system
v. Sensors operatively connected with: system hardware; a computing device capable of computer assisted processes; and a controller
vi. A computing device capable of capture, storage and processing of sensor data and feedback to the system;
vii. A controller; and
viii. An interface capable of information and data display.

The device of the invention uses a voltage source configured to provide an electrical voltage. In a preferred embodiment, a voltage conditioner is integrated with the device. The voltage conditioner is connected to a power source, and is configured to receive electrical energy from the power source and transform the electrical energy. Transforming the electrical energy comprises regulating voltage of the electrical energy and modifying frequency of the voltage; a converter configured to convert the electrical voltage from a direct current (DC) voltage input to an alternating current (AC) voltage output, and an electrical connection interface configured to electrically connect the converter to at least one electrode of the pair of electrodes disposed in the plasma reactor is incorporated. A feedback mechanism comprising a sensor configured to detect reaction data, and a control module communicatively connected to the feedback mechanism is also added, wherein the control module is configured to initiate a generation of an electrical discharge in the reaction region disposed between the first electrode and the second electrode as a function of the AC voltage output, such that the reaction region is configured to enable an interaction between the electrical discharge and a medium contained in the treatment chamber. In one embodiment, a crystal compressor may be connected to the voltage conditioner and the fluid inlet, wherein the crystal compressor is configured to receive the transformed electrical energy from an iron core coil, receive the fluid from the fluid inlet, generate the vapor as a function of the transformed electrical energy and the fluid and output the vapor using a vapor outlet.

In an important aspect of the invention, a modular plasma reactor device, capable of tessellation with and expansion by connection to other modular plasma devices is provided in order to amplify power and increase productivity, as well as a method of using the modular reactor in series is provided. The apparatus includes a modular plasma reactor, wherein the modular plasma reactor includes a housing, a modular ignition unit removably connected to the modular plasma reactor, a modular injector removably connected to the modular plasma reactor, a direct fluid source or manifold removably connected to the modular injector and a controller communicatively connected to one or more of the modular ignition unit and the modular injector; these components are integrated into a system and connected by a framework that provides for removal and replacement of individual components, including individual modular plasma reactors from the system.

In another aspect, a method for treating a growth medium for use in agriculture via an electrical discharge is described. The method includes transferring, by an atmospheric pressure system, at least a fluid to an injector, feeding, by the injector in fluidic connection with a plasma reactor, the at least a fluid through a reaction region of a plasma reactor, wherein the plasma reactor includes at least a pair of electrodes containing a first electrode and a second electrode, and the reaction region is disposed between the first electrode and the second electrode; supplying, by an ignition unit electrically connected to at least an electrode of the at least a pair of electrodes, an electrical voltage to the at least an electrode; producing, by the at least a pair of electrodes, an electrical discharge as a function of the at least a fluid; and enabling, by the reaction region, an interaction between the electrical discharge and a growth medium contained in a treatment chamber.

In still another aspect, a method for treating a medium via an electrical discharge is described where the method includes providing, by a voltage source, an electrical voltage; converting, by a converter, the electrical voltage from a direct current (DC) voltage input to an alternating current (AC) output; connecting, by an electrical connection interface, the converter to at least one electrode of a pair of electrodes disposed in the plasma reactor electrically, wherein the pair of electrodes includes a first electrode and a second electrode; initiating, by a control module, a generation of an electrical discharge in a reaction region disposed between the first electrode and the second electrode; enabling, by the reaction region, an interaction between the electrical discharge and a growth medium contained in the treatment chamber; and detecting, by a feedback mechanism, reaction data using a sensor.

Also, in an aspect, an improved injection unit for the plasma reactor is disclosed that protects the system from the persistent problem of quenching within the reactor. The device includes a vapor injection system that comprises a fluid inlet configured to transport a fluid in fluidic communication with a fluid source to the plasma reactor. The injector of the vapor injection system is configured to feed at least one fluid from the reservoir through the reaction region of the plasma reactor and further includes one or more fluid outlets, wherein the fluid outlets are configured to output the fluid.

In another aspect, a method for using a vapor injection system, wherein the method includes receiving, by a fluid inlet, a fluid from a fluid reservoir, receiving, by a voltage conditioner connected to a power source, electrical energy. The method also includes transforming, by the voltage conditioner, the electrical energy, wherein transforming the electrical energy comprises, regulating voltage of the electrical energy and modifying frequency of the electrical energy, generating, by a crystal compressor, vapor as function of the transformed electrical energy and the fluid and outputting, using a vapor outlet, the vapor.

In still another aspect, a low-pressure injection system for a plurality of fluids is provided. The system includes at least one first fluid inlet configured to receive a first fluid from a first fluid reservoir comprising the first fluid and at least one second fluid inlet configured to receive a second fluid from a second fluid reservoir comprising the second fluid. The system further includes a low-pressure compressor configured to provide pressure to the second fluid received from the second fluid reservoir and at least one injector configured to disperse a combination of the first fluid and the second fluid.

In a separate aspect, an apparatus for treating a substrate, such as a food substance, is disclosed. The apparatus may include a water supply tank connected to both a reaction chamber and a control module, which may generate a control signal. The water supply tank has a level line and a reservoir filled with water to the level line. The water supply tank may replenish water upon detection of depletion of water beneath the level line. That is, more specifically, the water supply tank may automatically replenish water by extracting additional water from a water source, such as a sink, reservoir, or other water container, which is fluidically connected to the water tank when the amount of water declines beneath the level line. The reaction chamber is connected to the water supply tank and includes a pair of electrodes with a first electrode and a second electrode positioned opposite to the first electrode, and a reaction region defined between the first electrode and the second electrode. The reaction region may at least temporarily retain the substrate. A control module is connected to at least the reaction chamber and may generate at least a control signal. The apparatus may also include an injector connecting the water supply tank to the reaction chamber. The injector may generate a dispersion of microfine water droplets from water extracted from the reservoir in response to receipt of the control signal. In addition, the apparatus may include a platform configured to support at least the reaction chamber and lay on a flat surface.

In yet another aspect, a method for generating a plasma for treatment of a substrate within a plasma reactor is disclosed. The method may include providing, by a voltage source, an electrical voltage, converting, by a converter, the electrical voltage from a direct current (DC) voltage input to an alternating current (AC) output. The method may also include connecting, by an electrical connection interface, the converter to at least one electrode of a pair of electrodes disposed in the plasma reactor, wherein the pair of electrodes comprises a reaction region defined between a first electrode and a second electrode positioned opposite to the first electrode; dispersing a plurality of water droplets extracted from a reservoir in a water tank fluidically connected to the plasma reactor into the reaction region, wherein the reservoir stores an amount of water. In addition, the method may include flowing a gaseous mixture into the plasma reactor, wherein at least some water droplets from the plurality of water droplets are configured to be suspended within the gaseous mixture and correspondingly produce a mist; igniting the plasma by generating an electrical discharge from the first electrode to the second electrode through the mist in the reaction region. Still further, the method may include treating the substrate by exposing the substrate to the plasma for a defined duration and replenishing the amount of water in the reservoir of the water tank automatically by extracting additional water from a water source fluidically connected to the water tank when the amount of water declines beneath a defined setpoint.

In an aspect, using the invention for generation of a fertilizer blend for use as a growth medium is described. The fertilizer blend includes a reactive mixture comprising a reactive oxygen species and a reactive nitrogen species. The fertilizer blend may further include an ocean brine solution having a filtered ocean blend, wherein the ocean brine solution further includes magnesium, sulfur, potassium, and calcium. Aspects of the present disclosure can be used to optimize the treatment process for growth medium, adapting changes in the electrical voltage, fluid, and/or other factors that may affect the electrical discharge. This is so, at least in part, because the apparatus includes an ignition unit with a control module communicatively connected to the feedback mechanism, wherein the control module is configured to regulate electrical discharge generation in the reaction region. The control module may adjust at least a treatment parameter of the apparatus as a function of the reaction data detected by the feedback mechanism during an interaction between the electrical discharge and the growth medium contained in the treatment chamber.

Aspects of the present disclosure also allow for growth medium treatment under low-temperature without damaging growth medium. Also, aspects of the present disclosure are directed to a low-pressure injection system for a plurality of fluids and method of use thereof. In an embodiment, the system includes at least one injector configured to disperse a first fluid and second fluid mixture. Aspects of the present disclosure can be used to generate microfine fluid droplets, which may allow a second fluid to become ionized and be transferred into the generated microfine fluid droplets. Exemplary embodiments illustrating aspects of the present disclosure are described below in the context of several specific examples.

In another aspect, a method of manufacturing a fertilizer blend for use as a growth medium is described. The method includes forming a reactive mixture having a reactive oxygen species and reactive nitrogen species, filtering an ocean blend to create an ocean brine solution, wherein the ocean brine solution includes magnesium, sulfur, potassium and calcium, and combining the reactive mixture and the ocean brine solution to create a fertilizer blend.

In yet another aspect, a method of using the fertilizer blend generated using the system of the invention is disclosed. The method includes applying a fertilizer blend to a growing plant, wherein the fertilizer blend includes a reactive mixture having a reactive oxygen species and a reactive nitrogen species, and an ocean brine solution having a filtered ocean blend, wherein the ocean brine solution further includes magnesium, sulfur, potassium, and calcium. The reactive mixture can be broadcast, irrigated, sprayed, or applied as gas using aeroponic, hydroponic or fogponic techniques.

Because of the greatly improved efficiency of the disclosed device, liquid treated in the plasma discharge becomes highly concentrated with RNS and especially with NOx compounds, in fact, the NOx concentration is measured to be at least three to six times that of other plasma water treatment technologies. The higher NOx concentration, combined with the greatly improved production volume enabled by the use of this device, system and methodology assure novelty, utility, and non-obviousness.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

These and other features, aspects and advantages of the present invention will become better understood with regard to the following description, appended claims, and accompanying drawings, where:

FIG. 2A shows a front view of the injector; FIG. 2B shows a cut-away view of the injector; FIG. 2C shows a removeable gas flow regulator of the injector and FIG. 2D shows the injector housing;

Figure 1:
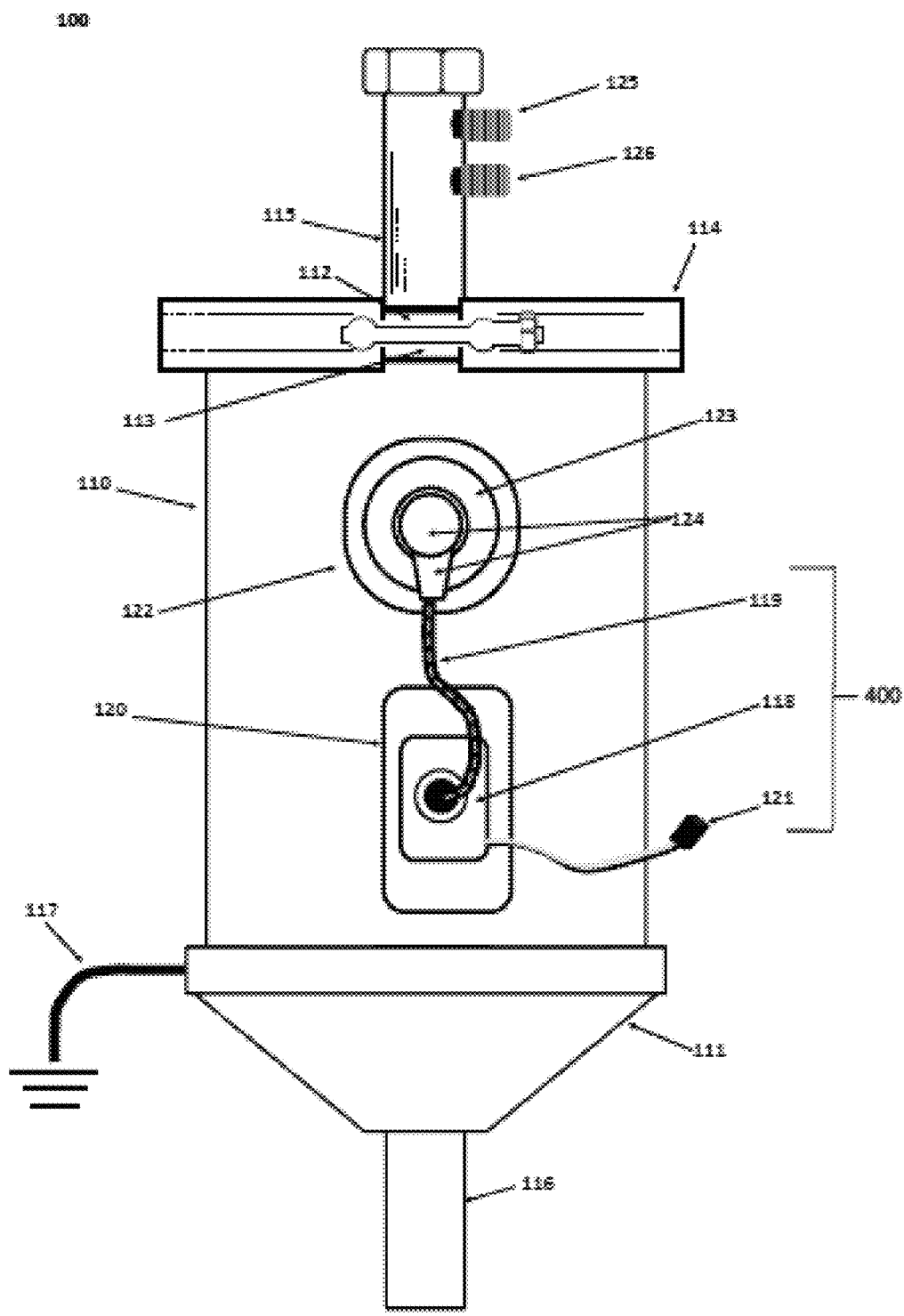
FIG. 1 is an elevation view an improved modular plasma reactor device.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

REFERENCE CHARACTERS USED IN THE DRAWINGS

100 Modular plasma reactor
110 Main body
111 Lower main body
112 Top cap
113 Mount flange
114 V-band clamp
115 Injector
116 Discharge connection
117 Ground connection
118 Ignition trans
119 High voltage wire
120 Transformer mounting bracket
121 Transformer power supply harness
122 Electrode mounting cup
123 High voltage insulator
124 Insulator boot
125 Gas inlet
126 Liquid inlet
127 High voltage connector
128 High voltage electrode
129 Ground electrode
130 Gas and liquid discharge
131 Plasma zone
132 Ionized gas and PA W
133 Flange gasket
135 Injector discharge port
136 Injector flow regulator unit
137 Injector body
138 Injector mounting port
139 Low pressure zone
140 High pressure zone
141 Mixing zone
142 Injector discharge port
150 Mobile nitrogen production system
151 Holding tank
152 Control switch
153 Side cover
154 Top cover
155 Cooling fan & filter
156 Holding tank drain
157 Cooling fan
158 Compressor
159 Power inlet
160 Control box
161 Water inlet manifold
162 System framework
163 Gas vent
164 Reactor drain system
165 Reactor mounting frame
167 Test Port
200 Voltage conditioner
201 Power cord
300 Water source
301 Water Hose or Conduit
302 Water filtration system
400 Ignition system

DESCRIPTION OF THE DRAWINGS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

The following description and associated drawings provide enablement of embodiments of the invention that have optimized for delivering an immediately available nitrogen source to plants. One skilled in the art would appreciate that nitrogen, as described herein as the source of reactive molecules, is one example of a product produced using the device, method and system that can be used for manufacture of a variety of other reactive molecules.

The present invention combines liquid, typically but not exclusively water, with a gas containing oxygen and nitrogen as feedstock for a chemical process. This process reforms the feedstock into an aqueous solution containing NOx compounds that can be used in agriculture and other industries. The NOx compounds are generated by forcing the gas and liquid through a specialized injector, where they are mixed and injected into a non-thermal plasma reactor. The injector releases the liquid into the reaction chamber of the device in the form of micro fine droplets, generally 50 microns or smaller in size; once in the reaction chamber, the microfine liquid droplets combine with the gas. When injected into a non-thermal plasma reactor having a high voltage discharge, the gas combined with the micro fine liquid droplets creates a gas plasma field. In this gas plasma field, the liquid, oxygen and nitrogen are ionized and form RNS and acids, which decompose or oxidize to create NOx compounds. In currently disclosed systems, water or other liquid injected into a gas plasma field can have a quenching or short circuit effect, but because the water is in the form of micro-fine droplets in the present invention, the short circuit reaction is avoided, and the NOx compounds are easily transferred into the water exiting the plasma reactor.

Referring to the figures, the mobile nitrogen production system as shown in the following drawings comprises components working together to generate an enhanced liquid product. The liquid contains high concentrations of NOx compounds that can be used within the agriculture and numerous other industries. The mobile nitrogen production system incorporates at least one improved and modular plasma reactor 100, which can be connected to and integrated with other plasma reactor 100 devices and supporting components disposed inside of the nitrogen production system.

FIG. 1 is an elevation view from the front of an improved and modular plasma reactor 100 that enables production of RNS as part of the mobile nitrogen production system. The FIG. 1 illustration depicts an embodiment of the improved modular plasma reactor 100 that is incorporated into the mobile nitrogen production system 150. It is important to recognize that the system shown and described can be scaled up or down to accommodate variable volume and concentration requirements to allow multiple and different applications, from domestic applications in residential use through much larger commercial or industrial scale, by increasing the size of the holding tank 102, using a throughput system that does not require a reservoir, and adding or removing modular plasma reactors 100 to the system. The technology presented in FIG. 1 along with all of its supporting components are scalable in size, throughput and specific product composition in different embodiments of the mobile nitrogen production system 100 shown in this figure.

In FIG. 1, an exemplary embodiment of a modular plasma reactor 100 is illustrated. This invention may be used for treating a growth medium. As used in this disclosure, a "growth medium" is typically water or another liquid capable of absorbing RNS produced within the modular plasma reactor 100. The growth medium containing RNS is a source of nitrogen that can be used to provide nutrient value to a wide range of plants, including but not limited to algae, cereal crops, fruit trees, ornamental and medicinal plants, legumes, vegetables crops, grasses, ornamentals, and others. The growth medium containing RNS is very stable and can be stored for later use or used immediately, and may be applied using a wide variety of delivery methods including but not limited to foliar feeding, banding, fertigation, soil injection, sub-surface injection, hydroponic application, flood irrigation, or other fertilization treatments. The growth medium containing RNS can be applied solely, or it can be mixed with a wide variety of other nutrients, surfactants and other growth enhancing chemicals.

With continued reference to FIG. 1, the modular plasma reactor 100 contains a main body 110, which houses the plasma treatment mechanisms and components. In a preferred embodiment, the main body 110 and other components as described are made from corrosion resistant stainless steel. The use of stainless steel in production of the main body 110 and other connected components ensures that there is no chance of galvanic corrosion from electrolysis of dissimilar metals and consequent metal fatigue; other consistently corrosive resistant materials may be used. The main body 110 also acts as an earth ground when a suitable ground connection wire, cable or other grounding device is connected to the ground connection 117. The ground connection 117 is welded to the exterior of the main body 110. Earlier and alternative versions of this technology incorporated glass, fiberglass, plastic, quartz, ceramics and other materials in the construction of a suitable plasma reactor, in all cases these materials proved to be costly, inefficient and unsuitable for use in a commercial plasma based chemical engineering environment.

Referring again to FIG. 1, the main body 110 also acts as a shield or barrier against the release of electromagnetic fields (EMF) and electric fields (E-Field) which are both produced inside of the main body 110 during plasma producing operations. These discharges are detrimental to human health when exposed to them on a recurring basis. The shielding aspect of this invention is a drastic improvement in safety and efficiency compared to all other models. Therefore, in a preferred embodiment, the main body 110 comprises corrosion-resistant stainless steel to prevent galvanic corrosion, and also to remove or reduce chemical, electronic, and electromagnetic emissions from the reactor body and ensure long-term durability.

Figure 3:
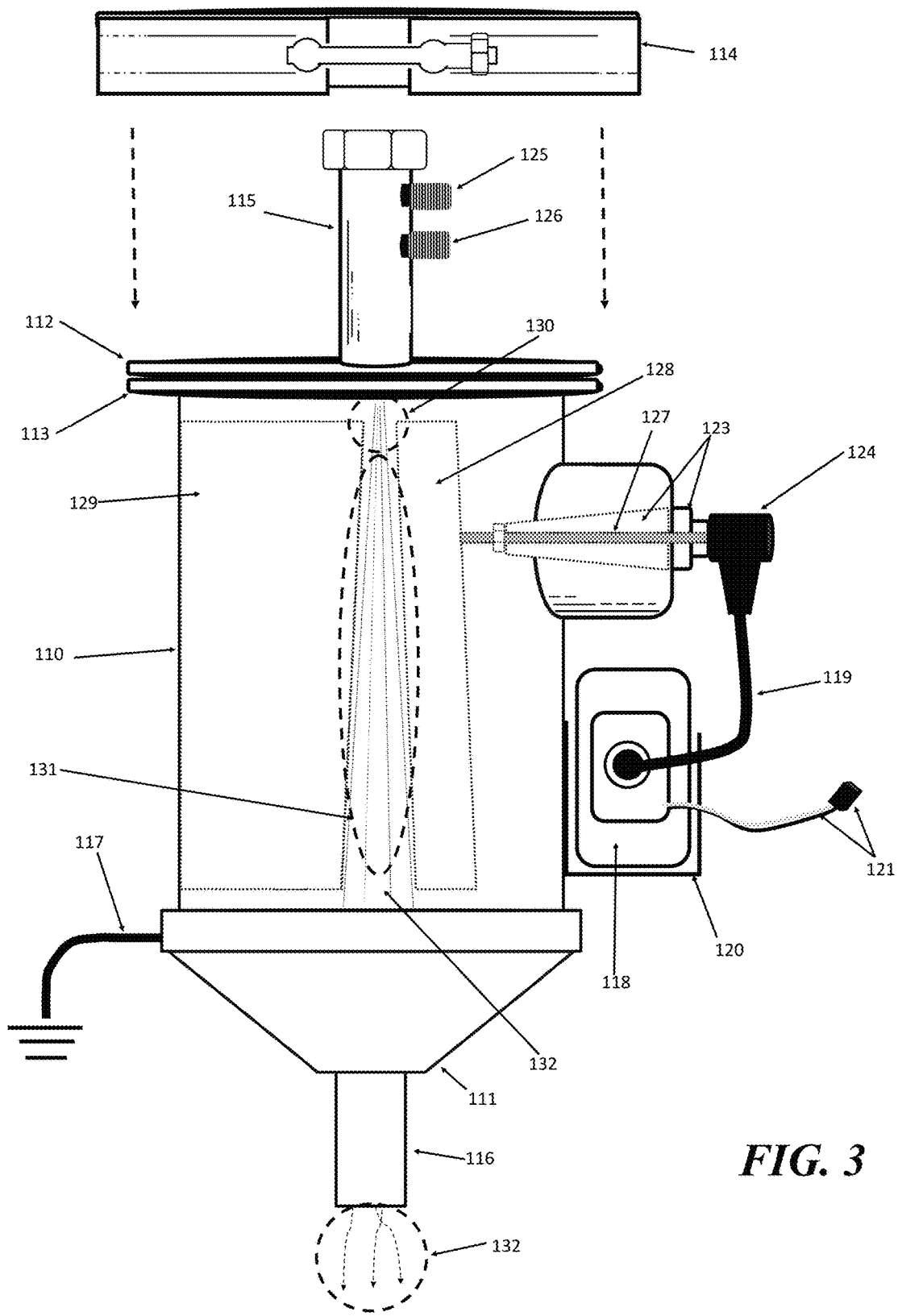
FIG. 3 is a cut-away elevation view of the device of the invention.

With continued reference to FIG. 1, the modular plasma reactor 100 has a main body 110, further comprising a plasma zone 131 (shown in FIG. 3) for generating and containing non-thermal plasma, and a plurality of inputs and outputs. The inputs include at least an injector 115, an ignition, and an ignition transformer 118, and the outputs include at least a ground connection and a discharge connection. A transformer mounting bracket 120 may be welded to the exterior of the main body 110 and the purpose of the transformer mounting bracket 120 is to enable the mounting of an ignition transformer 118 as close to the modular plasma reactor 100 as possible. The ignition transformer 118 is used to create a point-to-point high voltage electrical discharge between two or more electrodes as shown in FIG. 3. The ignition transformer 118 is connected to an AC or DC power supply using the transformer power supply harness 121. The ignition transformer 118 also connects to a high voltage connector 127 using a high voltage wire 119. The high voltage wire 119 is used to transfer high voltage electrical energy from the ignition transformer 118 to the high voltage connector 127. The high voltage wire 119 has an insulator boot 124 that is used to cover the connection between the high voltage wire 119 and the high voltage connector 127. The insulator boot 124 protects persons from electrical shock from the modular plasma reactor 100 while it is operating. The main body 110 also has an electrode mounting cup 122; the electrode mounting cup 122 is a stainless tube that is welded to the main body 110, mounted to the inside and outside of the electrode mounting cup 122 is the high voltage insulator 123. The high voltage insulator 123 houses the high voltage connector 127 preventing short circuit from occurring during operation of the modular plasma reactor 100.

With continued reference to FIG. 1, the modular plasma reactor 100 has a mount flange 113 which is welded to the top of the main body 110. The mount flange 113 is shaped like a flat round disc, it has an outer diameter that is approximately 25% larger than the main body 110, it also has a round opening on the inside of the mount flange 113 that is the same size of the main body 110. The modular plasma reactor 100 also has a top cap 112, the top cap 112 is the same diameter as the mount flange 113. The top cap 112, unlike the mount flange 113 has a small threaded hole at its center. The threads at the center of the top cap 112 allow for the mounting of the injector 115. Under the top cap 112 is a flange gasket 133. The flange gasket 133 is positioned between the top cap 112 and the mount flange 113 and is used to seal water and gas from escaping from the modular plasma reactor 100 during operation. A V-band clamp 114 is utilized to secure the top cap 112 to the mount flange 113. In operation, the v-band clamp 114 has a unique "V" shaped inner radius that allows the top cap 112, the mount flange and the flange gasket 133 fit within it's V shaped inner radius. As the v-band clamp 114 is tightened, it squeezes together the top cap 112, the flange gasket 133 and the mount flange 113 making a strong air and watertight seal, but still allowing for removal for maintenance and component replacement.

With continued reference to FIG. 1, the main body 110 has a lower main body 111 which is welded to the main body 110. The lower main body 111 is conical shaped having a progressively smaller radius at it's bottom end. At the bottom of the lower main body 111 is the discharge connection 116, the discharge connection 116 is a stainless pipe having an internal pipe thread that can be easily connected to a water collection apparatus. Because the discharge connection 116 is stainless and is welded to the lower main body 111, it can also be used to mount or secure the modular plasma reactor 100 to an assortment of support platforms.

Figure 2:
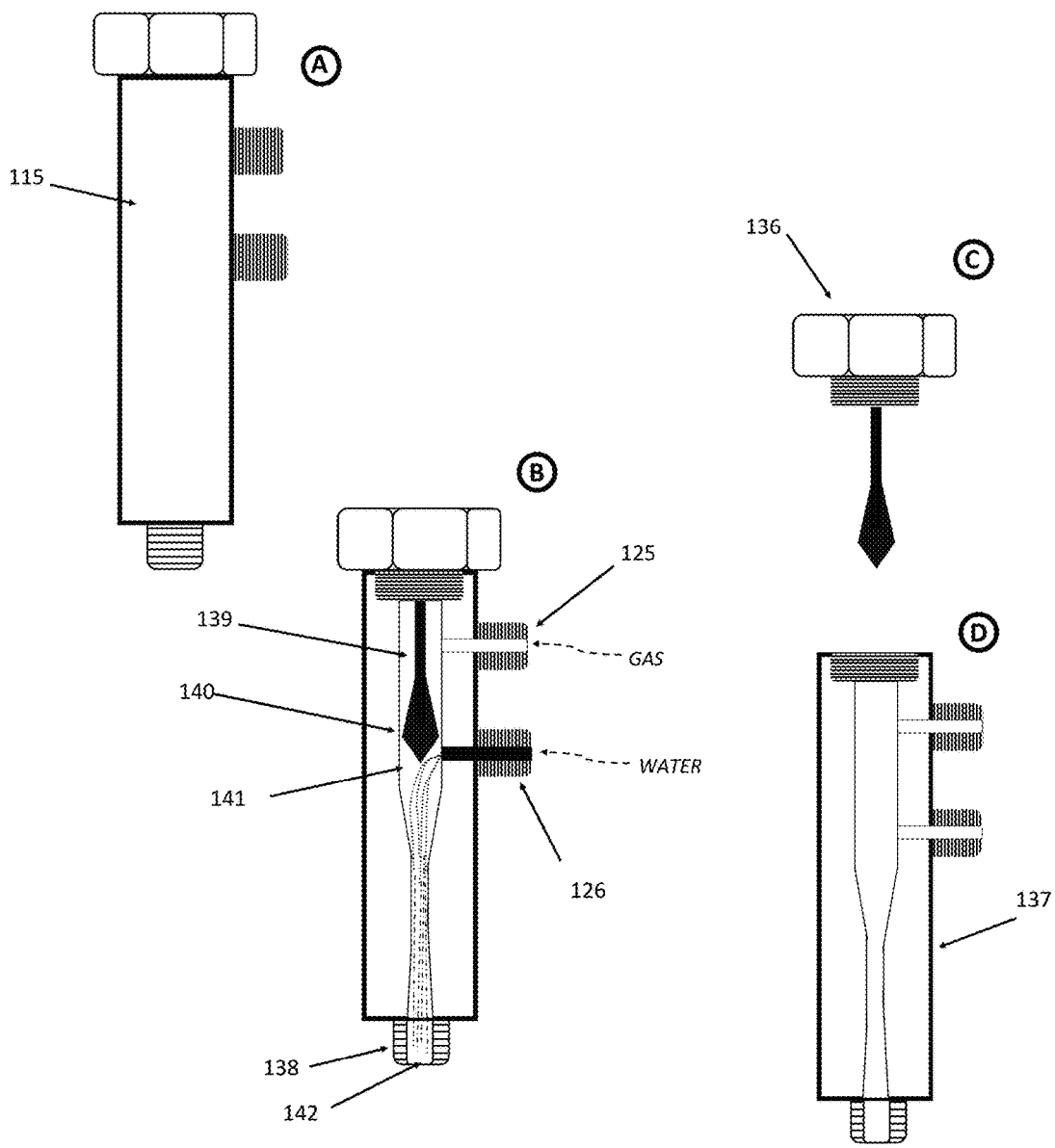
FIG. 2 is a set of drawings illustrating the improved fluid injector of the device, where

Now referring to FIG. 2, an exemplary embodiment of an improved injector 115 disposed within a modular plasma reactor 100 is provided. One or more fixed pintle injectors are removeably connected to the main body 110 and configured to introduce fluids into the plasma zone 131 of the modular plasma reactor 100. The injector 115 operates to deliver compressed gas and water to the inside of the main body 110 of the modular plasma reactor 100; here, the gas and water will undergo chemical processing that will generate water containing high amounts of RNS. The injector 115 is designed to produce and discharge a flow of fast-moving gas combined with a mixture of microfine water droplets. Historically, injectors used in plasma reactions have been plagued with reliability problems that were associated with the use of hard water. In operation, the injector would clog from hard water deposits which would halt function. The inability to mitigate or to remove hard water deposits that accumulated within the plasma reactor 100 significantly impaired function, and required that operation had to be halted until the injector 115 was removed and replaced. The improved injector 115 in this disclosure is able to overcome these operation limiting issues. The pintle of the injector 115 is fixed, meaning connected to the top portion of the injector 115, such that the pintle can be released via a threaded or catch mechanism and the pintle can be removed and replaced if the injector 115 fails. The injector 115 may be removeably attached to the to the main body 110 by a threaded injection mounting port 138.

With continued reference to FIG. 2, the improved injector 115 has specific sections that are each designed to perform a unique task. The injector 115 has an injector body 137. In a preferred embodiment, the injector body 137 is made of stainless steel, brass or another corrosion resistant material; in one embodiment the injector body 137 is plastic. The injector body 137 has threaded ports that include at least the injector mounting port 138, the gas inlet 125 and the liquid inlet 126. Each of these ports are threaded externally but surround a hollow passage which allows gas or liquid to enter and exit. The injector body 137 also comprises a hollow area that extends from one end to the other, and is connected to the gas inlet 125 and liquid inlet 126. The injector 115 further comprises an injector flow regulator unit 136. In a preferred embodiment, the injector flow regulator unit 136 is also made from stainless steel, brass, plastic or other solid and non-corroding material. In one embodiment it has a hexagonal head and a threaded portion below the hexagonal head that allows it to attach to the injector body 137; one skilled in the art would appreciate that other shaped or configured heads could be used. A fixed pintle, comprising a head and a threaded portion below the head that allows it to removeably attach to the mounting port 138, and a pintle body that comprises a first end, a center portion and a second end. The first end is continuous with or is connected to the threaded portion, and the pintle body is relatively narrow at each of the first end and the second end, and is relatively wider in the center, creating an area of high pressure or high pressure zone 140 above the center and an area of low pressure, the low pressure zone 139, below the center during operation; the shape and diameter of the pintle of the injector flow regulator unit 136 is configured to fit loosely into the injector body 137. In operation, with the injector flow regulator unit 136 securely fastened into the injector body 137, gas flows into the gas inlet 125 and into the low pressure region 139. As the gas moves down toward the bottom of the injector body 137 it moves from the narrower to the wider diameter of the injector flow regulator unit 136, into a high pressure zone 139 which is in the area near the widest portion of the shaped section of the injector flow regulator 136. At this point, the gas reaches its highest pressure and speed. As the high pressure and high-speed gas continues to move downward inside of the injector body 137, it passes into a mixing zone 141. The mixing zone 141 is positioned below the high-pressure zone 140 inside of the injector body 137. Below the end of the injector flow regulator 136 and the high-pressure zone 140, a vacuum is created by the sudden pressure drop of gas flowing into the mixing zone 141. Because of the pressure drop within the mixing zone 141, liquid is pulled into the injector body 137 through the liquid inlet 126. Once inside the mixing zone 141 the liquid, reduced into micro-fine droplets and accompanies the gas as they flow together out through the injector discharge port 142 located at the bottom of the injector body 137.

In FIG. 3, further details of an exemplary embodiment of a modular plasma reactor 100 are illustrated. In this exploded and sectional view, an injector 115 is attached to the top cap 112. The capped injector 115 is mounted on top of the plasma reactor 100 by a mounting flange 113 which is connected to the main body 110. In FIG. 3, the main body 110 exterior has been partially removed in order to demonstrate the location and function of the various components located inside it. The modular plasma reactor 100 device further comprises an improved nozzle connected to or continuously formed with the injector 115; this may be connected with a compressor 158, and is thereby capable of delivering the compressed gas and shearing the liquid into microfine droplets and reducing cluster size to less than fifty microns and directing them into the reactor 100 in a defined discharge cone in order to increase the surface area of the liquid in the reactor. This increases plasma penetration into the liquid and the efficiency of transfer between the gas and liquid, and allows for water to cool the electrodes without quenching the reaction, and further prevents quenching of the reaction in the plasma zone 131. The dotted lines with arrows at the top of the drawing represent the removable positioning of the v-band clamp 114 over and around the top cap 112 and mount flange 113 on the assembled reactor main body 110. The rounded dotted lines represent the location of the gas and liquid discharge 130, the plasma zone 131, and the area for release of the ionized gas and PAW 132.

With continued reference to FIG. 3, the main body 110 is the center of the chemical engineering processes that happen in the modular plasma reactor 100. The configuration of the main body 110 represents significant improvements in form and function from previous devices designed to operate in the same field of use. The main body 110 comprises a ground electrode 129; in a preferred embodiment the ground electrode 129 is configured as a flat plate made from a stainless alloy that is deemed suitable for use in the harsh plasma operating environment. The present invention is configured to utilize one or more ground electrodes 129 depending on the size and intended function of the modular plasma reactor 100. The ground electrode 129 is attached to or formed contiguous with the inside of the main body 110. The ground electrode 129 also has a general rectangular shape, but is wider at the top end than at the bottom. The angle machined into the ground electrode 129 is 6 deg to 8 deg depending on main body 110 size and intended function of the modular plasma unit 100. Also located inside of the main body 110 is a high voltage electrode 128, the high voltage electrode 128 is made from a flat stainless-steel alloy and is not welded or fixed in any way to the main body 110 using an electrically conductive material. The high voltage electrode 128 has a general rectangular shape to it, like the ground electrode 129 the high voltage electrode 128 also has a is 6 deg to 8 degree slope on the side facing the center of the main body 110, the angular difference on the inside of the high voltage electrode 128 is determined by intended size and function of the modular plasma unit 100. The ground electrode 129 and high voltage electrode 128 are configured with this pitch angle of 6 to 8 degrees in this embodiment to conform to the desired angle of a discharge cone of the injector 115 in order to optimize plasma formation and plasma penetration, thereby increasing efficiency of transfer of gas phase ions into the water. The high voltage electrode 128 is supported by the high voltage connector 127. The high voltage connector 127 is made from a stainless-steel alloy and is welded to the high voltage electrode 128. The high voltage connector 127 extends from the high voltage electrode 128 through the electrode mounting cup 122 to the outside of the main body 110. Attached to the electrode mounting cup 122 and the high voltage connector 127 is the high voltage insulator 123. The high voltage insulator 123 is hollow in the center allowing the high voltage connector 127 to pass through it without coming in contact with any conductive surface, it is made from a material that will not allow electrical current to flow through freely. The high voltage insulator 123 is also a hard and very durable material that will structurally support the weight of the high voltage electrode 128. A ground discharge system comprising a ground connection 117 facilitates a safe path for electricity to discharge and stabilize the electrical network during plasma generation.

With continued reference to FIG. 3, an ignition system comprising an ignition transformer 118 is mounted on the exterior of the reactor main body 110 by a transformer mounting bracket 120 or is disposed in close proximity to the main body 110. The ignition system further comprises a voltage conditioner capable of transforming electrical energy by regulating voltage and modifying frequency, and the ignition system is configured to generate a high-voltage point-to-point electrical discharge between at least two electrodes within the reaction chamber. The ignition transformer 118 is capable of regulating power to the system to allow the use of power from power sources which conform to varying regional standards, meaning power from power sources in any country or from any standard power output can be effectively used with the system. It is also capable of using power from renewable systems such as solar, wind, hydro or thermal power sources, as the ignition transformer 118 can transform the power source for use with the system. The ignition transformer 118 is attached to the main body 110 by the transformer mounting bracket 120, or is located in close proximity to the modular plasma reactor 100. The ignition transformer 118 receives an electrical input from the transformer power supply harness 121, the ignition transformer 118 amplifies the voltage, and in some cases the frequency also into an AC or DC output. That output power is sent to the high voltage connector 127 by the high voltage wire 119. The high voltage wire 119 has a multi-strand tinned copper core surrounded by a silicone rubber exterior. To avoid shock, the high voltage wire 119 is covered by an insulator boot 124 at the point of where it connects with the high voltage connector 127. In this way, the transformer is capable of regulating power to the system to allow the use of power from a variety of sources including international power supplies that differ in terms of capacity, power flow and power sources, and which conform to varying regional standards.

With further reference to FIG. 3, the ground electrode 129 and the high voltage electrode 128 converge from their mounted positions inside of the main body 110 to meet in close proximity to one another near the center of the main body 110. At this location, the distance between the ground electrode 129 and the high voltage electrode 128 is less than 4 millimeters. At the bottom of the ground electrode 129 and the high voltage electrode 128 the distance between the electrodes is increased to greater than 20 millimeters; this is due to the pitch angle machined onto the electrode face. In an embodiment as illustrated, the pitch angle is 6-8. The injector 115 is positioned directly above the area where the ground electrode 129 and the high voltage electrode 128 converge. At the bottom of the injector 115 is the injector discharge port 142. In operation, the injector discharge port 142 releases a gas and liquid discharge 130 directly into the area between the ground electrode 129 and the high voltage electrode 128. The injector 115 is configured in such a way that the gas and liquid discharge 130 have the same cone shaped spray pattern as the 6-8 degree pitch machined into the ground electrode 129 and high voltage electrode 128. In operation, as the gas of the gas and liquid discharge 130 passes between the ground electrode 129 and high voltage electrode 128, a plasma is formed creating an assortment of RNS. Because of the presence of micro-fine liquid droplets (5-15 μm) positioned by the injector 115 to be in contact with the gas, much of the RNS is transferred into the liquid. This produces a stable liquid enhanced with nitrogen and potentially other reactive species, capable of direct application to growing plants.

FIG. 3 further shows the reactor drain system 164 contemplated by the invention. The reactor drain system 164 includes the discharge connection 116, operating to transfer plasma-treated water containing high concentrations of reactive compounds from the reactor into a holding tank, a receiving tank, or transfer tube or other conduit for removal from the mobile nitrogen production system 150 and application.

Figure 4:
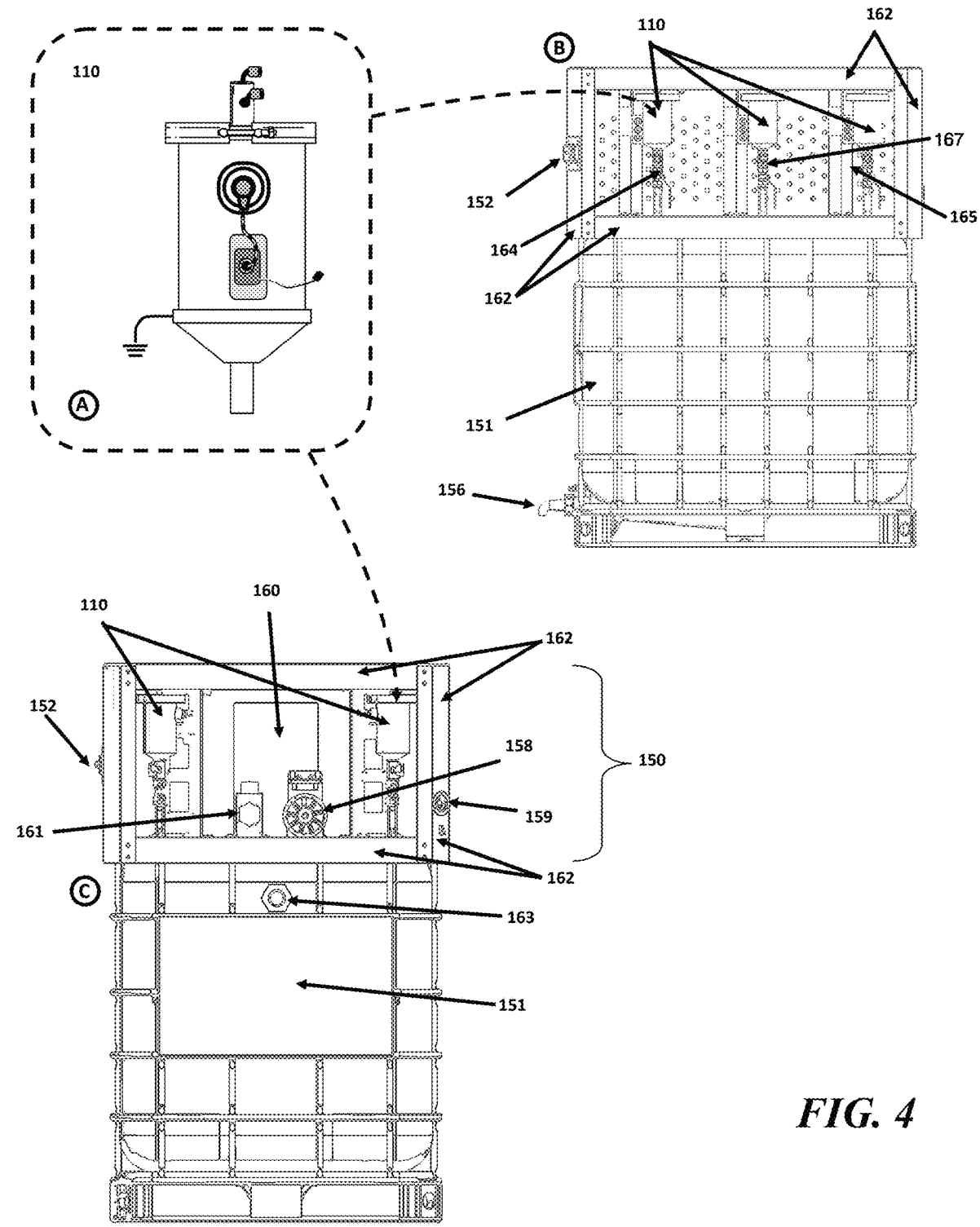
FIG. 4 is an exploded and elevation views; (A) shows the improved modular plasma device, and (B) and (C) show the relative position of the device within the mobile nitrogen production system and additional components integrating (A).

FIG. 4 is an exploded and elevation views; (A) shows the improved modular plasma device, and (B) and (C) show the relative position of the device within the mobile nitrogen production system and additional components integrating (A). FIG. 4(A) represents an exploded view of a modular plasma reactor 100 to demonstrate the position of multiple modular plasma reactors 100 within a reactor system framework 162. The dotted lines are environmental only, and the dotted arrows indicate the positioning of the improved modular plasma reactor 100 within the reactor system framework 162. A plurality of modular plasma reactors 100 may be connected or disconnected in series to scale production of RNS and ROS up or down. The modular plasma reactor 100 includes a self-contained ignition unit, a mounting bracket, a discharge connection and a specialized injector 115 used to deliver air and water to a plasma reaction chamber. Two or more of the modular plasma reactors 100 are fixed to the inside of the nitrogen production unit 150 using the reactor mounting frame 165. The modular plasma reactor 100 and the reactor mounting frame 165 are fastened inside of the system framework 162. Also attached to the modular plasma reactor 100 is the reactor drain system 164 which connects the mobile nitrogen production system 150 to the holding tank 151. Plasma treated water is transferred from the modular plasma reactor 100 through the reactor drain system 164 and into the holding tank 156. Gas produced by the modular plasma reactor 100 enters the holding tank 156 via the reactor drain system 164 gas is vented out of the holding tank 156 via the gas vent 163.

With continued reference to FIG. 4, additional components are illustrated that perform various functions within the mobile nitrogen production system 150 in FIG. 4(B). Fixed to the system framework 162 is a power inlet 159. The power inlet 159 is an electrical port that connects local utility power to the mobile nitrogen production system 150 using a simple 15-amp power cord. The power inlet 159 is connected to the control box 160 using standard 14- or 16-gauge wire having a hot, a neutral and ground wire. Also fixed to the inside of the system framework 162 is a water inlet manifold 161, the water inlet manifold 161 receives water from an outside supply source. The water inlet manifold 161 reduces the water pressure and flow rate to a pressure and volume suitable for use in the modular plasma reactor 100. The water inlet manifold 161 is connected to the modular plasma reactor 100 using a series of internal hoses and fittings. A compressor 158 is also mounted to the system framework 162, the compressor 158 compresses air to a pressure and volume suitable for use by the modular plasma reactor 100. The compressor 158 operates via electrical power supplied from the control box 160 using standard 14- or 16-gauge wire having a hot, a neutral and ground wire. Also depicted is one location for the test ports 167 and sensors. One or more test ports 167 including sensors are located on the reactor, and allow for measurement of the mobile nitrogen production system's 150 throughput volume, pH, gas and liquid temperatures, and other critical operative indicia, and provide information to a control box 160. The control box 160 is connected to each of the modular plasma reactors 100 using standard 16-20 gauge wire having a hot, a neutral and ground wire. The control box 160 is connected to the control switch 152 using standard 14- or 16-gauge wire having a hot, a neutral and ground wire. The control switch 152 manages all on-off functions of the mobile nitrogen production system 150 including all of its electrical components, and the control box 160 relays information to the controller. The controller is communicatively connected to the modular plasma reactor 100, test port 167 and sensors, and the ignition system, and is configured to manage the plasma generation process. By providing sensors in the test ports 167 operatively connected to the control box 160 and controller, the mobile nitrogen production system 150 operations, including operating temperature, pH, and throughput volume, can be modified to improve system efficiency under varying environmental or operational conditions.

Figure 5:
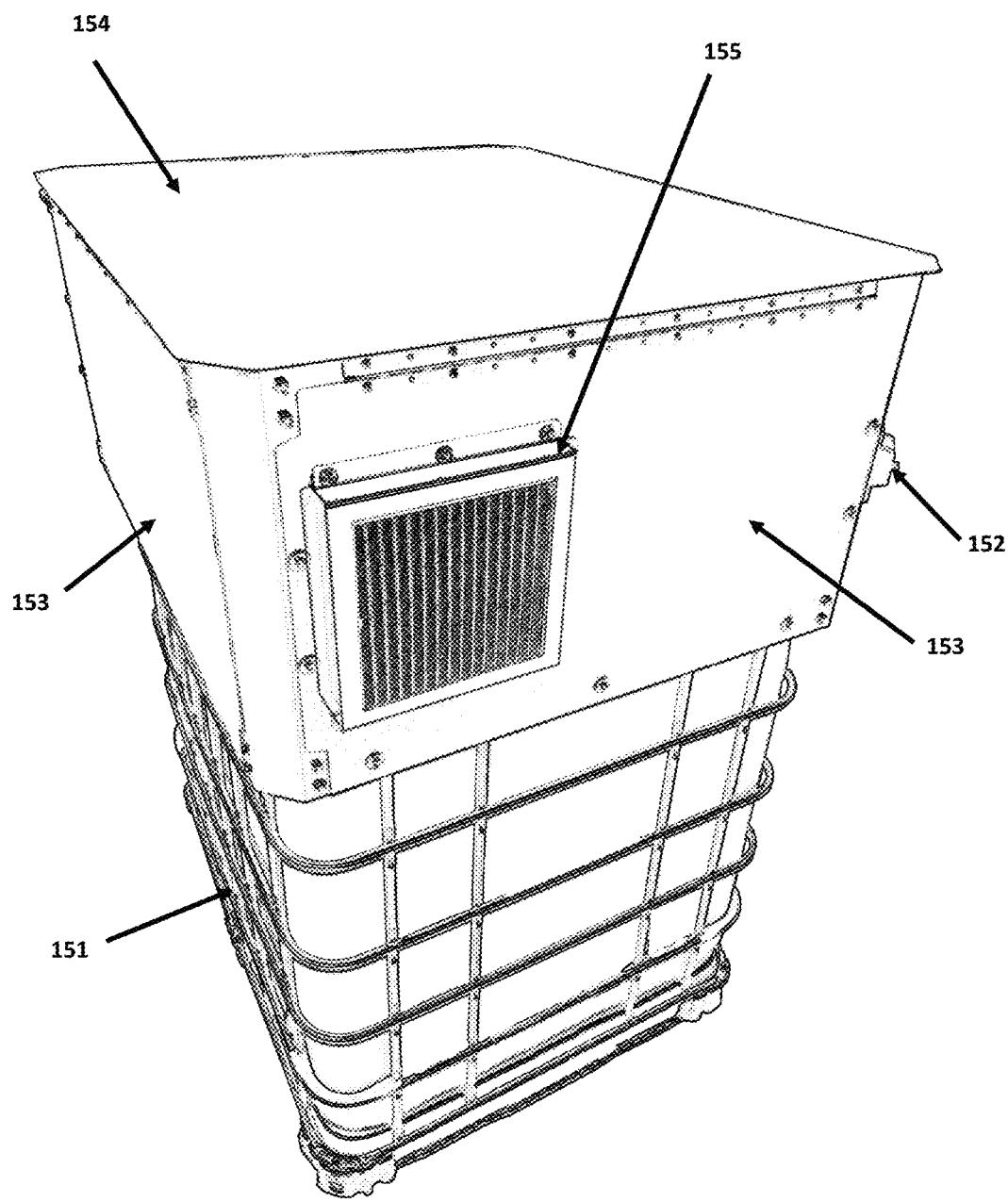
FIG. 5 is a perspective view that illustrates a preferred embodiment of the improved modular plasma reactor integrated into a framework.

As shown in FIG. 5, the exterior of an embodiment of the mobile nitrogen production system 150 comprises up to four side covers 153, a top cover 154, a cooling fan and filter 155, a control switch 152 and a power inlet 159. The mobile nitrogen production system 150 is mounted on top of a holding tank 151. The holding tank 151 is designed to store plasma treated water or liquid exiting the mobile nitrogen production system 150 until needed. The holding tank 151 may be a standard or modified farm tote with framework capable of supporting the weight and bulk of the mobile nitrogen production system 150. This FIG. 5 illustrates a preferred embodiment of the improved modular plasma reactor integrated into a framework and fixed to the top of an Intermediate Bulk Container (IBC).

A plurality of modular plasma reactors 100 may be connected or disconnected in series to scale production of reactive molecules, including RNS and ROS, up or down. Two or more of the modular plasma reactors 100 are fixed to the inside of the mobile nitrogen production system 150 using the system framework 162. The modular plasma reactor 100 and the reactor mounting frame 165 are fastened inside of the system framework 162. Also attached to the modular plasma reactor 100 is the reactor drain system 164 which connects the mobile nitrogen production system 150 to the holding tank 151. Plasma treated water is transferred from the modular plasma unit 100 through the reactor drain system 164 and into the holding tank 151. Gas produced by the modular plasma reactor 100 entering the holding tank 151 via the reactor drain system 164 is vented out of the holding tank 151 via the gas vent 163.

Figure 6:
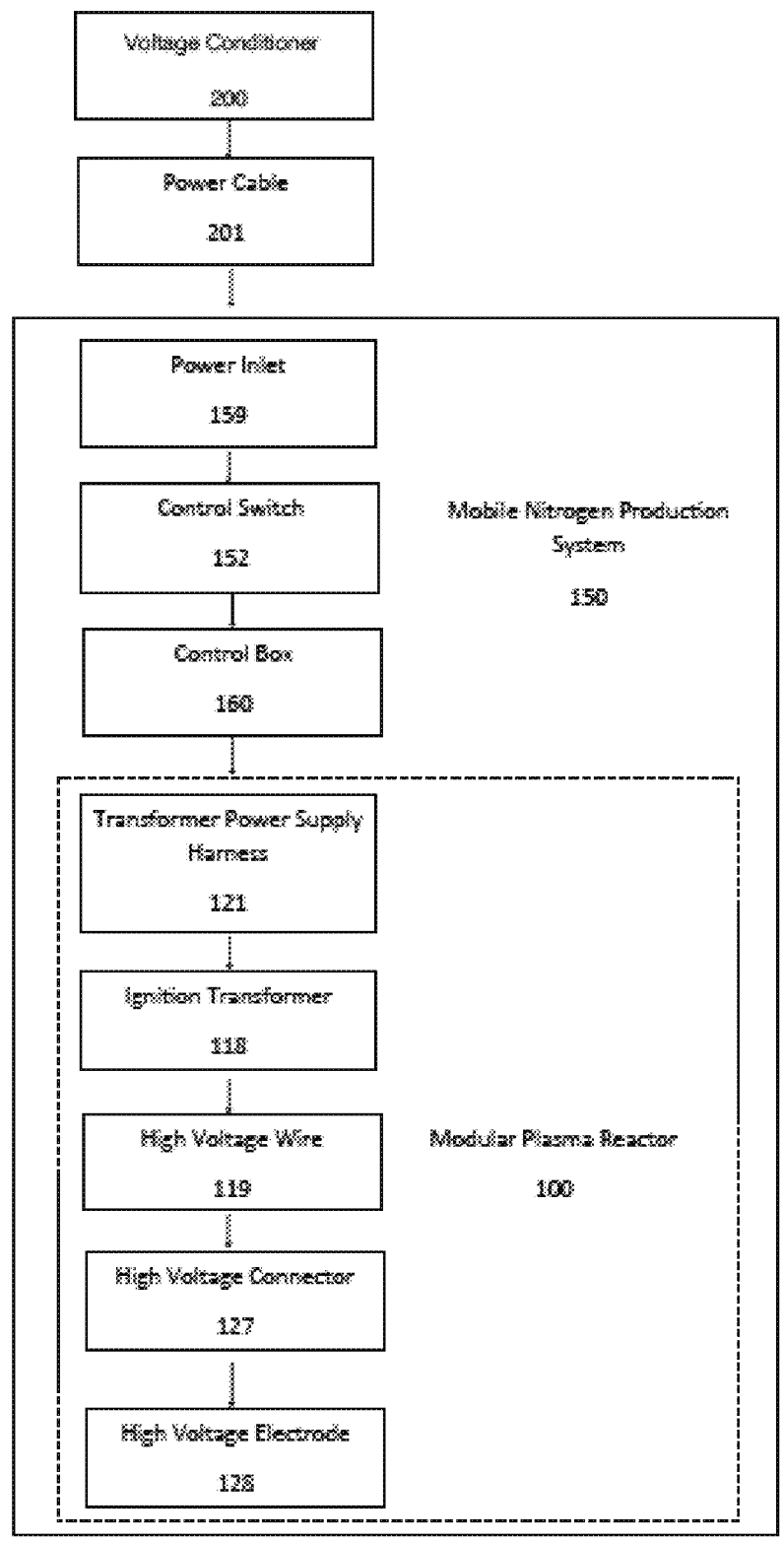
FIG. 6 illustrates the process flow of electrical power used to operate a modular plasma reactor and a mobile nitrogen production system.

Now referring to FIG. 6, a process flow drawing, illustrating the invention including the flow of the electrical power and information used in the mobile nitrogen production system 150. For clarification, electrical power can be in the form of alternating current (AC) or direct current (DC) as the modular plasma reactor 100 and the mobile nitrogen production system 150 can be configured to operate equally as well with an AC or DC power supply. Referring to the FIG. 6 drawing, both the modular plasma reactor 100 and the mobile nitrogen production system 150 are illustrated. In the FIG. 6 illustration, the mobile nitrogen production system 150 is shown to include the modular plasma reactor 100 along with additional components discussed throughout this disclosure. Both the modular plasma reactor 100 and the mobile nitrogen production system 150 require electrical power to function, that electrical power comes from the voltage conditioner 200. The voltage conditioner 200 is specifically used to convert one voltage type (AC or DC), single or 3-phase, 50 or 60 hz into a voltage and frequency suitable for use with the mobile nitrogen production system 150. The voltage conditioner 200 is connected to the power cable 201, the power cable 201 is a cord that carries electrical power from a voltage conditioner 200 to the mobile nitrogen production system 150. In one embodiment, the power cable may be 2, 3, 4 or 5 conductor wire; any cable capable of safely providing the voltage and current to the mobile nitrogen production system 150 could be deployed.

With continued reference to FIG. 6, the power cable 201 connects to a power inlet 159; the power inlet 159 is attached to the mobile nitrogen production system 150 and is a physical link between the power cable 201 and the mobile nitrogen production system 150. The power inlet 159 connects to a controller, including a control box 160 and an interface in connection with the control box 160, which is configured to control and display computer implemented functions directing system performance. The control box 160 is also connected electronically to each modular plasma reactor 100, and the control box 160 is configured to manage the electrical and operational functions of the mobile nitrogen production system 150. A control switch 152 is actuated by electrical wires or conduit within the mobile nitrogen production system 150. The control switch 152 may be any number of devices capable of turning on or off the mobile nitrogen production system 150 including, but not limited to, a mechanical switch having a push-button, rocker, touch screen, etc., as well as electronic switching devices such as programmable logic controls, micro-processors and remote on-off operation using cell phones, computer monitors, tablets and other devices. Whatever the control switch 152 type, it is connected to the control box 160 via electrical wires or conduit within the mobile nitrogen production system 150. The control box 160 also functions as a power distribution hub, once the control box 160 is powered by the operation of the control switch 152 the components within it direct electrical power to one or more individual modular plasma reactors 100 via the transformer power supply harness 121. The transformer power supply harness 121 delivers electrical power from the control box 160 to the ignition transformer 118. The ignition transformer 118 is a device that amplifies the voltage and frequency of the electrical power delivered to it by the transformer power supply harness 121. The ignition transformer 118 includes a high voltage wire 119 which has a stranded metal core covered by a silicone insulation external layer. The high voltage wire 119 delivers electrical energy to the high voltage connector 127 which is a solid metal rod that is welded directly to the high voltage electrode 128.

With continued reference to FIG. 6, in operation, the control switch 152 completes an electrical circuit between the power inlet 159 and the control box 160. The control box 160 supply's electrical power to the transformer power supply harness 121 which links the control box 160 to the ignition transformer 118. The ignition transformer 118 produces a suitable voltage and frequency for use by the high voltage electrode 128 in order to create an effective plasma discharge. The high voltage wire 119 delivers the suitable voltage and frequency to the high voltage connector 127 which is also connected to the high voltage electrode 128. Because of the positioning of the high voltage electrode 128 in relation to the ground electrode 129, a point-to-point electrical arc is produced between the two electrodes which proceeds the formation of a plasma discharge.

Figure 7:
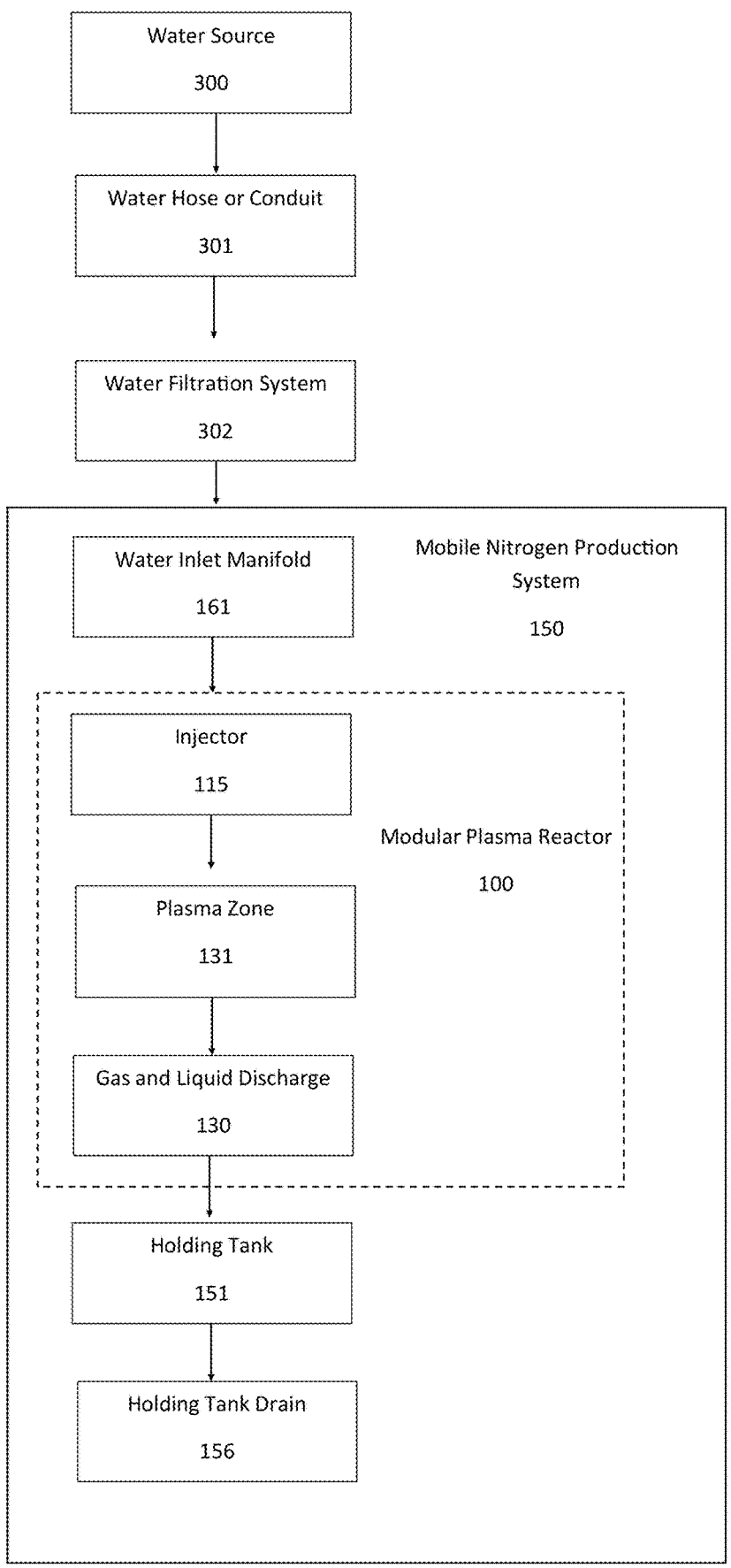
FIG. 7 illustrates the process flow of water used by the modular plasma reactor and a mobile nitrogen production system to create water containing RNS.

Now referring to FIG. 7, a process flow drawing illustrating the flow of the water used with the modular plasma reactor 100 and the nitrogen production system 150 is shown. The term water source 300 is used to describe a broad range of water types including but not limited to municipal water, well water, pond water, brackish water, salt water, distilled water, rain water, etc. While all of these types of water possess both ideal and limiting factors, they can all be conditioned to work favorably with the modular plasma reactor 100 and the nitrogen production system 150 where the intended goal is to produce water containing RNS.

With continued reference to FIG. 7, the system according to an embodiment comprises a compressor 158 and a water inlet manifold 161 in electrical and operational connection with the control box 160, configured to supply compressed air and regulated water flow continuously to the modular plasma reactors 100 in series. In operation, water is supplied by a water source 300 under pressure from the compressor 158 to a water filtration system 302 via the water hose or conduit 301. The water filtration system 302 may be directly connected to the mobile nitrogen production system 150 or connected using a second water hose or conduit 301. In either case, the integrated water filtration system 302 is capable of selective binding, removal, and addition of targeted molecules and compounds from or to the mobile nitrogen production system 150.

The water filtration system 302 further comprises one or more of the following: particulate filters, reverse osmosis unit, water softener, and remineralization filters. The filtered water entering the nitrogen production system 150 enters a water inlet manifold 161, and from the water inlet manifold 161, the water travels directly to the injector 115 via a system of hoses connecting the water inlet manifold 161 to the injector 115. The injector 115, with its improved nozzle, is designed to mix water into a flowing stream of air in such a way that the water is converted into micro-fine water droplets (5-50 µm). The water and air exiting the injector 115, next enter the plasma zone 131. In the plasma zone 131, the air becomes high ionized producing both RNS and ROS. The water passing through the plasma zone 131 is also affected by the plasma discharge, upon coming in contact with the plasma, the water molecules become restructured, in other terms, the weak external covalent bond that binds water molecules into large clusters is diminished creating much smaller clusters. The smaller water clusters make the water far more soluble allowing for significant increases in the mass transfer of RNS into the water. After the plasma zone 131, the water falls into the gas and liquid discharge 130 section of the modular plasma reactor 100. The gas and liquid discharge 130 is a metal connection at the bottom of the modular plasma reactor 100, it may include a metal or PVC pipe or hose that connects it to the reactor drain system 164 and into a holding tank 151. The holding tank 151 is used to temporarily store the plasma treated water until needed elsewhere. The holding tank 151 features a holding tank drain 156 which is a mechanical valve that allows the contents of the holding tank 151 to be emptied or transferred for use elsewhere.

The controller of the modular plasma reactor 100 is operatively integrated with the control box 160, and is configured to manage and optimize the operational functions of the modular plasma reactor 100. The controller includes one or more of the following: a programmable logic control or microprocessing unit for executing control commands, processing input signals, and optimizing system performance based on real-time data received from the sensors; an interface for receiving user inputs and providing operational feedback, compatible with mechanical switches, touch screens, and electronic switching devices for remote operation via cell phones, computer monitors, tablets, and other devices; a computing device operatively connected to the controller, comprising storage capabilities for storing operational data, control algorithms, and historical performance metrics; processing and microprocessing capabilities for real-time analysis and control of system components, including modulation of electrical power supply, monitoring of plasma reactor parameters, and adjustment of water and air input ratios for optimal Reactive Nitrogen Species (RNS) and Reactive Oxygen Species (ROS) production; and a feedback mechanism utilizing data from the test ports 167 and sensors to manually or automatically adjust plasma generation parameters.

This disclosure further contemplates a method of using a plurality of the modular plasma reactors 100 integrated into the mobile nitrogen production system 150 of the invention. The method comprises a series of steps for generating a plasma using the mobile nitrogen production system 150. These steps include the following, not necessarily in the exact order presented: (1) supplying electrical power from a voltage source 200, which may be alternating current (AC) or direct current (DC), to the mobile nitrogen production system 150 via a power cord 201 and power inlet 159; (2) using the controller to complete an electrical circuit between the power inlet 159 and the control box 160, and directing power to a transformer power supply harness 121; (3) modifying the voltage and frequency of the electrical power using an ignition transformer 118, and delivering this power via a high voltage wire 119 to a high voltage electrode 128; (4) generating a point-to-point electrical arc between the high voltage electrode and a ground electrode to facilitate the formation of a plasma discharge; (5) mixing water from a water source with air in the injector 115, injecting it through a nozzle to shear water clusters and create microfine water droplets and introducing the water and air mixture into the plasma reactor; (6) exposing the water and air mixture to the plasma to create reactive species and enhance solubility for mass transfer of reactive molecules; and (7) draining and capturing the concentrated plasma-treated liquid from the system for storage and use.

Additionally, the method can be used for generating concentrated RNS and ROS, by addition of the steps including treating the water by supplying the water from the water source 300 and directing the water through a water filtration system 302 via a water hose or conduit 301, then into a water inlet manifold 161 of the mobile nitrogen production system 150, then transporting the liquid from the water inlet manifold 161 to one or more injectors 115 via connecting hoses. The method of using the invention disclosed herein can also be used with water and energy from virtually any source, because of the specialized water filtration system 302 and ignition transformer 118, by adding the steps of capture and transport of water from a water source 300 that includes one or more of municipal, well, pond, brackish, salt, distilled, or rain water; and providing power to the power source through a power cord 201 that includes one or more of electric, solar, wind, steam or hydro power or stored power from batteries.

I claim:

1. An improved modular plasma reactor device comprising:
   a main body, further comprising a plasma zone for generating and containing non-thermal plasma, and a plurality of inputs and outputs, wherein said inputs include at least one or more fixed pintle injectors, an ignition system, and a transformer and said outputs include at least a ground connection and a discharge connection;
   the one or more fixed pintle injectors removeably connected to the main body by an injection mounting port, each fixed pintle injector further including one or more fluid inlets for fluids including at least one liquid and at least one gas, and wherein each inlet is configured to introduce fluids into the one or more fixed pintle injectors for injection into the main body; and further includes an injection flow regulator unit for regulation of the flow rate of the respective fluid;
   the ignition system, wherein the ignition system comprises an ignition transformer mounted on the exterior of the main body by a mounting bracket or is disposed in close proximity to the main body, and wherein the ignition system further comprises a voltage conditioner capable of transforming electrical energy by regulating voltage and modifying frequency; and wherein the ignition system is configured to generate a high-voltage point-to-point electrical arc resulting in a plasma discharge between a plurality of electrodes within the plasma zone; wherein the ignition transformer is capable of regulating power to the system to allow the use of power from power sources which conform to varying regional standards;
   the plurality of electrodes including at least a ground electrode in contact with a ground discharge system and a high voltage electrode connected with the ignition system by a high voltage connector, wherein the ground electrode and the high voltage electrode are configured to create a high voltage electrical discharge between the plurality of electrodes;
   the ground discharge system to facilitate a safe path for electricity to discharge and stabilize the electrical network during plasma generation;
   a reactor drain system comprising the discharge connection connecting a reaction chamber with a holding tank operating to transfer plasma-treated water containing high concentrations of reactive compounds from the reaction chamber into the holding tank, a receiving tank, or transfer tube;
   one or more test ports further comprising sensors for monitoring the reactor's operation and providing real time data on plasma characteristics and process parameters;
   a controller communicatively connected to the modular plasma reactor, test port and sensors, and the ignition system, configured to manage the plasma generation process.

2. The modular plasma reactor device according to claim 1, wherein the main body comprises corrosion-resistant stainless steel to prevent galvanic corrosion, remove or reduce chemical, electronic, and electromagnetic emissions from the main body and ensure long-term durability.

3. The modular plasma reactor device according to claim 1, wherein the fixed pintle injector is made of stainless steel, brass, or plastic, and is connected with a compressor designed to deliver compressed gas and liquid to the injector.

4. The modular plasma reactor device according to claim 1 wherein the injector flow regulator unit is made with solid and non-corroding materials and further includes the fixed pintle portion of the fixed pintle injector, comprising a head and a threaded portion below the head that allows it to removeably attach to the injection mounting port, and a pintle body that comprises a first end, a center, and a second end, wherein the center is disposed between the first end and the second end, and wherein the first end is continuous with or is connected to the threaded portion, and wherein the pintle body is relatively narrow at each of the first end and the second end, and is relatively wider in the center, creating an area of high pressure above the center and low pressure below the center during operation; and wherein the shape and diameter of the pintle of the injector flow regulator unit is configured to fit loosely into the fixed pintle injector.

5. The modular plasma reactor device according to claim 3, further comprising an improved nozzle connected to or continuously formed with the fixed pintle injector and capable of delivering compressed gas and shearing the liquid into microfine droplets to less than fifty microns and directing them into the reactor in a defined discharge cone in order to (i) increase the surface area of the liquid in the reactor, thereby increasing plasma penetration into the liquid and the efficiency of transfer between the gas and liquid; (ii) allow water cooling of the plurality of electrodes, and (iii) prevent quenching of the reaction in the plasma zone.

6. The modular plasma reactor device according to claim 1, wherein the plurality of electrodes are made of a stainless steel alloy, and wherein the high voltage electrode is not welded or fixed to the main body, and is supported by the high voltage connector extending through an electrode mounting cup and is insulated by a high voltage insulator, and the high voltage electrode is substantially rectangular in shape, but has narrower end and a wider end that is wider than the narrower end.

7. The modular plasma reactor device according to claim 1, wherein the ground electrode is attached to or formed contiguously with the main body and is substantially rectangular shaped but has a wider end and a narrower end that is narrower than the wider end.

8. The modular plasma reactor device according to claim 1, wherein the ground electrode and high voltage electrode are configured with a pitch angle of 6 to 8 degrees conforming to the angle of a discharge cone of the fixed pintle injector to optimize plasma formation and plasma penetration, thereby increasing efficiency of transfer of gas phase ions into the water.

9. The modular plasma reactor device according to claim 1, further comprising a top cap above and removably connected to the main body and a flange gasket positioned between the top cap and a mount flange, and also further comprising a V-band clamp to secure the top cap to the mount flange, ensuring a strong airtight and watertight seal, and providing a means for the mount flange and top cap to be removed for maintenance and component replacement.

10. The modular plasma reactor device according to claim 1, wherein the controller is operatively integrated with a control box, and is configured to manage and optimize the operational functions of the modular plasma reactor, wherein the controller includes:
   a programmable logic control or microprocessing unit for executing control commands, processing input signals, and optimizing system performance based on real-time data received from the sensors;
   an interface for receiving user inputs and providing operational feedback, compatible with mechanical switches, touch screens, and electronic switching devices for remote operation via cell phones, computer monitors, tablets, and other devices;
   a computing device operatively connected to the controller, comprising storage capabilities for storing operational data, control algorithms, and historical performance metrics;
   processing and microprocessing capabilities for real-time analysis and control of system components, including modulation of electrical power supply, monitoring of plasma reactor parameters, and adjustment of water and air input ratios for optimal Reactive Nitrogen Species (RNS) and Reactive Oxygen Species (ROS) production; and
   a feedback mechanism utilizing data from the test ports and sensors to manually or automatically adjust plasma generation parameters.

11. A mobile nitrogen production system for plasma treatment of fluids, comprising a plurality of the modular plasma reactors according to claim 1, connected in series by a framework capable of releasably securing, connecting, and thereby integrating the plurality of plasma reactors to scale the production of reactive nitrogen species (RNS).

12. The mobile nitrogen production system according to claim 11, wherein the framework further comprises one or more of the following: a reactor mounting frame housing the plurality of modular plasma reactors; top and side covers covering the reactor mounting frame; one or more of cooling fans, filters, and vents; the holding tank for storing plasma-treated liquid; and a power inlet to receive power from an external power source.

13. The mobile nitrogen production system according to claim 11, wherein the controller comprises a control box and an interface in connection with the control box and is configured to control and display computer implemented functions directing system performance, wherein the control box is connected electronically to each modular plasma reactor, and wherein the control box is configured to manage the electrical and operational functions of the system.

14. The mobile nitrogen production system according to claim 13, further comprising a compressor and a water inlet manifold in electrical and operational connection with the control box, configured to supply compressed air and regulated water flow continuously to the modular plasma reactors.

15. The mobile nitrogen production system according to claim 11, further comprising an external cover, cooling fan, and air vent to maintain optimal operating conditions within the nitrogen production system.

16. The mobile nitrogen production system according to claim 11, further comprising an integrated water filtration system capable of selective binding, removal, and addition of targeted molecules and compounds from or to the nitrogen production system.

17. The mobile nitrogen production system according to claim 16, wherein the water filtration system further comprises one or more of the following: particulate filters, reverse osmosis unit, water softener, and remineralization filter.

18. A method for generating a plasma using the mobile nitrogen production system according to claim 11, further comprising the steps of:
   supplying electrical power from the voltage conditioner, which may be alternating current (AC) or direct current (DC), to the mobile nitrogen production system via a power cable and power inlet;
   using the controller to complete an electrical circuit between the power inlet and the control box, and directing power to a transformer power supply harness;
   modifying the voltage and frequency of the electrical power using the ignition transformer, and delivering this power via a high voltage wire to the high voltage electrode;
   generating the point-to-point electrical arc between the high voltage electrode and the ground electrode to facilitate the formation of a plasma discharge;
   mixing water from a water source with air in the one or more fixed-pintle injectors, injecting it through a nozzle to shear water clusters and to create micro-fine water droplets and introducing the water and air mixture into the plasma reactor;
   exposing the water and air mixture to the plasma to create reactive species and enhance solubility for mass transfer of reactive molecules; and
   draining and capturing the concentrated plasma-treated liquid from the system for storage and use.

19. The method according to claim 18 for generating concentrated RNS and ROS, the method further comprising the steps of treating water by supplying the water from the water source and directing the water through a water filtration system via a water hose or conduit, then into a water inlet manifold of the mobile nitrogen production system, then transporting the liquid from the water inlet manifold to the one or more fixed pintle injectors via connecting hoses.

20. The method according to claim 19, wherein the steps include capture and transport of water from a source that includes one or more of municipal, well, pond, brackish, salt, distilled, or rain water; and accessing and providing power to the power source, wherein the power source is connected with one or more of electric, solar, wind, steam or hydro power or stored power from batteries.

* * * * *